Oct. 5, 1965   A. H. JORDAN ETAL   3,209,877
LOST MOTION TIME DELAY TRANSMITTING APPARATUS
Filed June 21, 1963   3 Sheets-Sheet 1

INVENTORS.
ARTHUR H. JORDAN
WILLIAM J. AMBROSE
BY Arthur H. Swanson
ATTORNEY.

Oct. 5, 1965   A. H. JORDAN ETAL   3,209,877
LOST MOTION TIME DELAY TRANSMITTING APPARATUS
Filed June 21, 1963   3 Sheets-Sheet 2
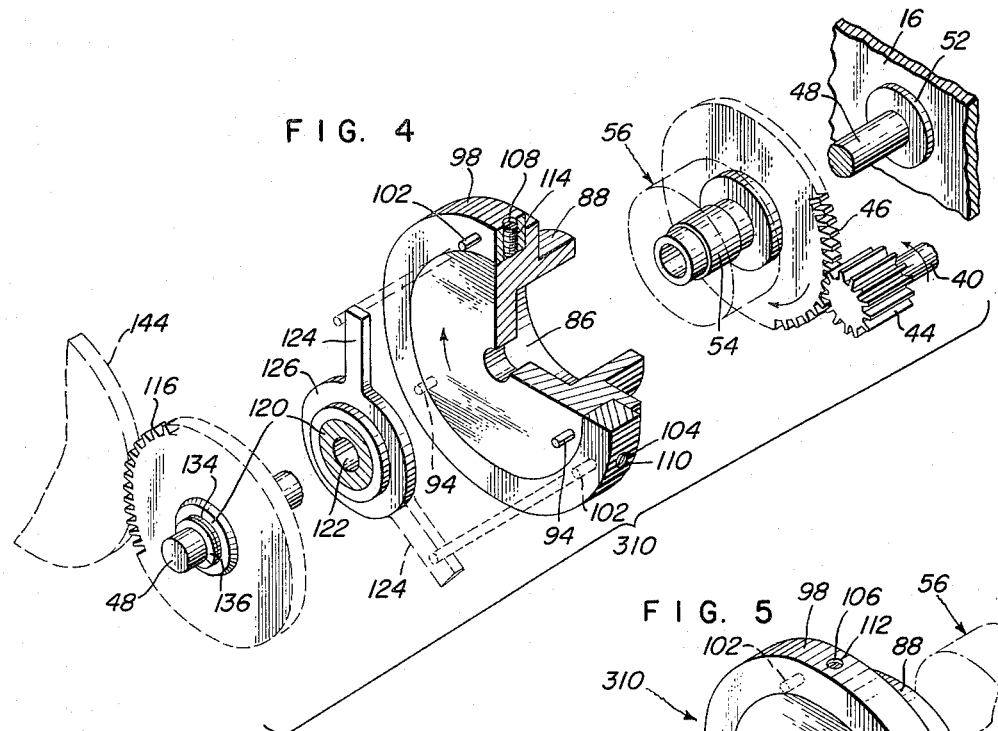
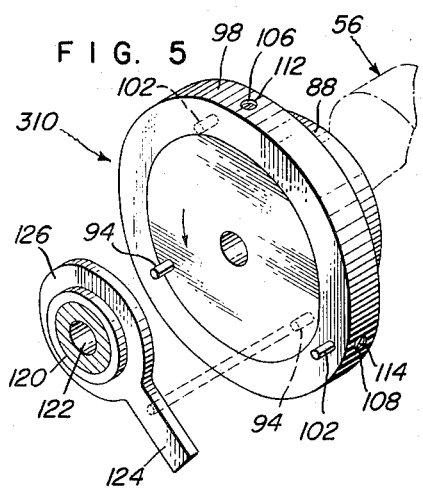
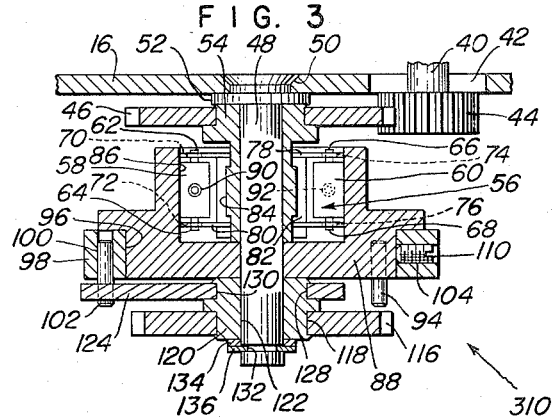
INVENTORS.
ARTHUR H. JORDAN
WILLIAM J. AMBROSE
BY
ATTORNEY.

Oct. 5, 1965   A. H. JORDAN ETAL   3,209,877
LOST MOTION TIME DELAY TRANSMITTING APPARATUS
Filed June 21, 1963   3 Sheets-Sheet 3

INVENTORS.
ARTHUR H. JORDAN
BY   WILLIAM J. AMBROSE

ATTORNEY.

United States Patent Office 3,209,877
Patented Oct. 5, 1965

3,209,877
LOST MOTION TIME DELAY TRANS-
MITTING APPARATUS
Arthur H. Jordan, Bala Cynwyd, and William J. Ambrose,
Springfield, Pa., assignors to Honeywell Inc., a corporation of Delaware
Filed June 21, 1963, Ser. No. 289,565
6 Claims. (Cl. 192—139)

Application of Arthur H. Jordan and William J. Ambrose for a patent on improvements in Lost Motion Time Delay Transmitting Apparatus.

The object of the invention is to provide a time delay apparatus in a motion-transmitting system.

Another object of the present invention is to provide a time delay apparatus between a transmitter and an integrating device, such as a digital counter.

While it is possible to purchase time delay apparatus, such commercially-available apparatus often requires the use of dash pots, bi-metal and electrical components such as resistors and capacitors which components are capable of introducing considerable error into the time delay apparatus because they are subject to adverse ambient temperature changes.

To this end, it is one of the objects of the present invention to provide an improved type of time delay apparatus for a measuring apparatus which apparatus is not subject to errors resulting from changes in ambient temperature.

It is still another object of the present invention to provide a time delay apparatus that requires fewer parts than the commercially-available time delay mechanisms, which have been referred to supra, and which because of its simplicity in this regard is, therefore, less subject to error.

Another more specific object of the present invention is to employ not only a time delay apparatus for a motion transmitting system that is not only less complex than the previously-mentioned, commercially-available timing mechanism referred to supra, but which is extremely accurate in that it depends on the accuracy of a reversible, synchronous, clock-type motor.

A further object of the present invention is to provide a delay apparatus in which an arm, integral with the face of a driven gear of an integrator-driving gear train, is engaged by a pin that is integral with a gear being driven by the aforementioned, reversible, synchronous clock motor only after any one of a number of preselected times has elapsed after the synchronous clock motor has been energized.

Another object of the invention is to employ a friction drag means between the aforementioned delay apparatus and an integrator, driven by the driving gear train, to allow the clock motor to drive the integrator only when the clock motor is being rotated in one or two directions.

It is still a more specific object of the present invention to provide a delay apparatus of the aforementioned type for use with a digital integrator counter that is employed in a pulse duration, pulse width, or time impulse type of telemetering system in which the magnitude of a measured variable, such as flow of a fluid passing through a conduit, is translated by a telemeter transmitter into a telemetered electric impulse signal of a predetermined time length that is proportional to the magnitude of the measured variable so that the digital counter, at a remote pulse-receiving station, may be activated to indicate total integrated flow.

A better understanding of the present invention may be had from the following detailed description, when read in connection with the accompanying drawings, in which:

FIG. 3 is a sectional view, taken along section line 3—3 of FIG. 2, showing details of an adjustably-fixed, spaced-apart, pin-gear detent lever connection operably connected with a one-way roller clutch drive structure;

Figure 6:
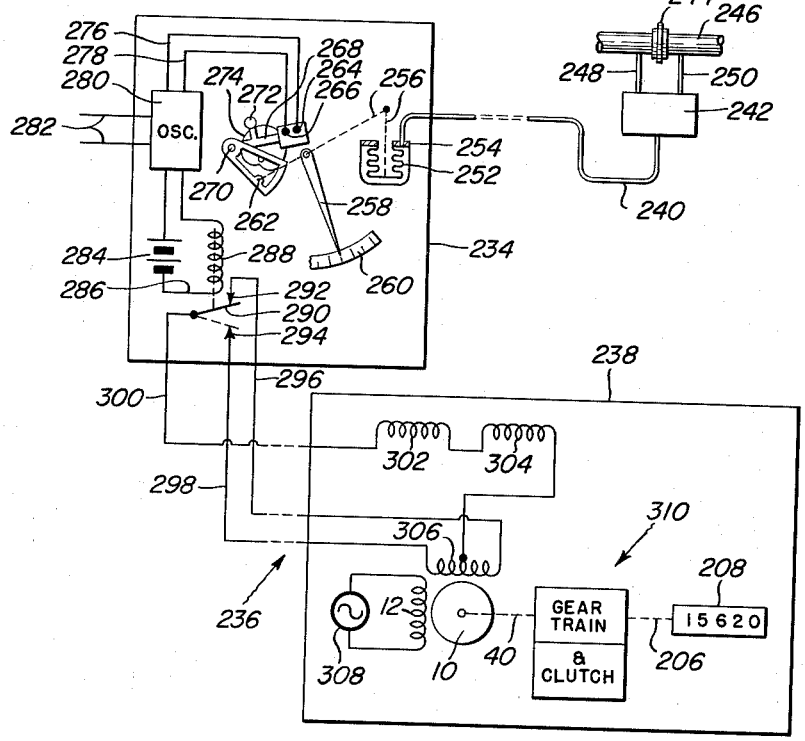
Figure 7:
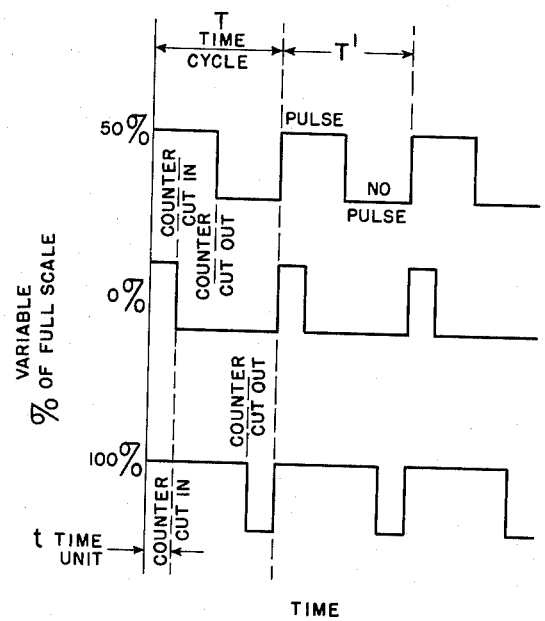

FIG. 4 is an exploded, isometric view of the transmitting apparatus showing, in solid and dotted line form, the respective initial and any one of a number of second positions of the selectively spaced-apart drive pins when the motor and clutch parts associated therewith are rotated in a direction that will enable angular displacement of the motor shaft to be transmitted to a driving gear that is employed to drive a counter or some other motion-receiving means;

FIG. 5 is a partial exploded isometric view of the transmitting apparatus showing, in solid and dotted line form, how the selectively spaced-apart drive pins are rotated in a direction opposite to that shown in FIG. 4 back to their initial, spaced-apart position when the motor and clutch parts associated therewith are rotated in an opposite direction to that shown in FIG. 4 and thereby provide a preselected initial time delay when the motor is again reversed to drive the aforementioned driving gear;

FIG. 6 shows a schematic arrangement of a switch and the aforementioned pulse duration telemetering system which enables an operator to send a pulse from a telemeter transmitter through a telemeter channel to cut in a remotely-located electric motor with an electric power supply to rotate the motor in one direction and register a count on a digital counter or to rotate it in the opposite direction so no count is placed on the counter, and;

FIG. 7 discloses how the aforementioned reverse rotation of the motor will enable the improved time delay apparatus, disclosed in FIGS. 1–6, to clutch-in the motion being transmitted by the previously-referred-to synchronous motor with the counter driving gear after any one of a number of fixed preselected intervals of time and to thereafter unclutch the driving gear from the reversible motor drive after a period of pulse time has elapsed which will depend on the magnitude of the measured variable that is being measured by a primary element at the telemeter transmitter.

Unless otherwise noted, corresponding components shown in the various figures carry corresponding reference characters.

Figure 1:
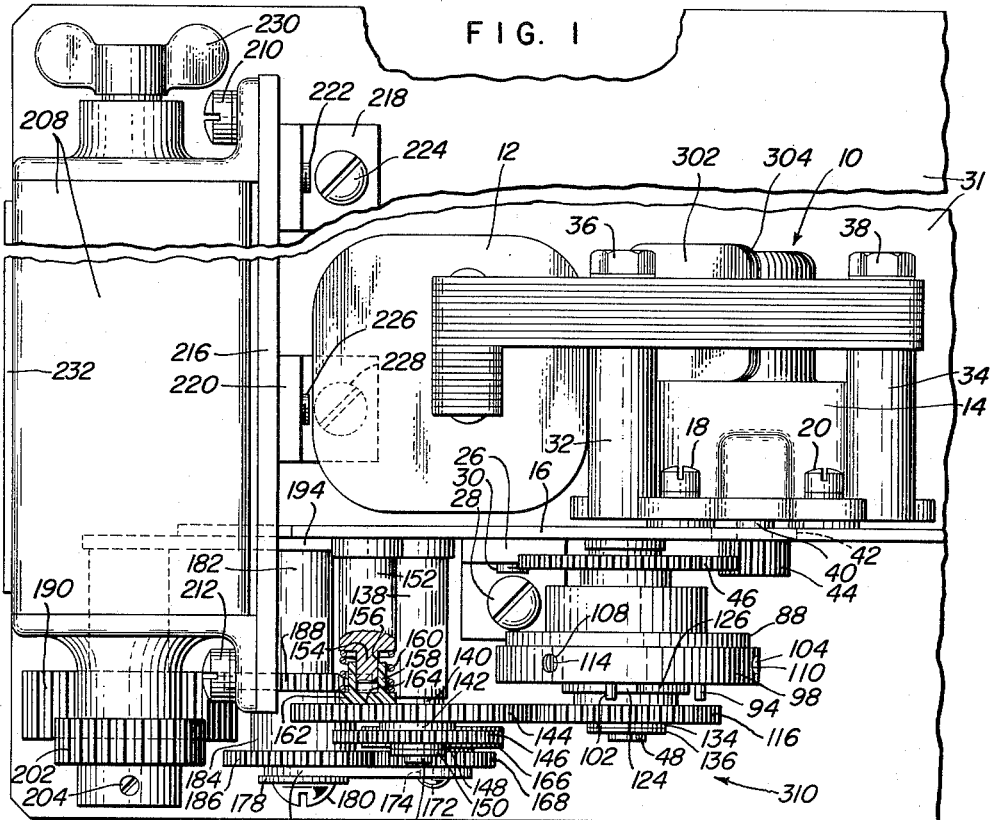
FIG. 1 is a top plan view of the improved, motion-transmitting apparatus.

FIG. 1 of the drawing shows a reversible, electric, clock motor 10 comprising conventional parts, such as the field coil 12 and a motor gear barrel casing 14 shown supported on a bracket 16 by means of the four screw-washer connecting means 18, 20, 22, 24.

The bracket 16, in turn, is connected by one or more braces 26, and screw washer connections 28, 30 to a base plate 31.

Other parts of the motor are shown supported on embossed portions of the casings 32, 34 that are integral with the gear barrel casing 14 by means of the screw-washer connecting means 36, 38.

The reversible electric, clock motor 10 is provided with a shaft 40 protruding through an apertured wall portion 42 formed in the bracket 16. A pinion 44 is shown fixedly mounted for joint movement with the shaft 40 and in driving engagement with the gear 46 that is rotatably mounted on a stub shaft 48. As is best shown in FIG. 3, the inner end of the stub shaft 48 is fixedly connected to the stationary bracket 16 by passing this end through the countersunk apertured wall 50 and then staking or peening this inner end of the stub shaft 48 to the bracket 16.

A shoulder 52 forms an integral part of the stub shaft 48. A hollow hub 54 of a substantially cylindrical configuration is shown rotatably mounted on the stub shaft 48 and having its inner end in slidable engagement with the outer wall of the fixed shoulder 52.

The previously-mentioned gear 46 is shown fixedly staked to the inner peripheral wall of the hub 54 for rotation therewith. A remaining circumferential portion of the hub 54 is shown having a commercially-available, one-way, roller clutch 56 mounted for rotation in either a clockwise or counterclockwise direction therewith. The clutch 56 is provided with a plurality of spring-biased rollers, e.g., 58, 60, having pins 62, 64, 66, 68 that are mounted in associated, slotted-out wall portions 70, 72, 74, 76 in the ring-shaped side plates 78, 80. The clutch 56 has a hollow part 82 having its inner surface in fixed engagement for rotation with the hub 54 and an outer, square-shaped, peripheral surface 84. When the motor cam drives the pinion 44, gear 46, hub 54 and the square-shaped part 84 in the direction indicated by the arrows in FIG. 4, this action will cause each of the rollers 58, 60, shown in FIG. 3, to be wedged in frictional driving engagement between flat portions of the square-shaped peripheral surface 84 and an inner wall surface 86 of the clutch plate 88 that is acting as an outer race for the aforementioned rollers.

When the motor 10 drives the pinion 44, gear 46, hub 54 and the square-shaped part 84 in the opposite direction from that shown in FIG. 4, this action will allow the springs 90, 92 to apply their respective spring forces to their associated rollers 58, 60. Under this condition, the outer surfaces of the rollers 58, 60 will be brought into rolling non-driving contact and the axes of the rollers will be retained in a substantially-fixed position in their associated side wall portions 70, 72, 74, 76. A first pin 94 is shown in FIG. 3 as being fixedly mounted in and protruding from the outer, front surface of the clutch plate 88. The clutch plate 88 has an outer cylindrical surface 96 for supporting a ring plate 98 thereon. The ring plate 98 has a cylindrically-shaped apertured wall 100 into which one end of a second pin 102 is press-fitted to retain it in a fixed position therewith. The outer peripheral wall portion of the ring plate 98 is provided with three equally-spaced-apart, threaded, apertured wall portions 104, 106, 108.

Each of the cup point set screws 110, 112, 114 is employed to threadedly engage its associated threaded wall portion 104, 106, 108.

Each of the set screws 110–114 is tightened until its inner ends frictionally engage, in biting immovable contact with the outer surface 96 of the clutch plate 88.

I can thus be seen that the screw connecting means 110–114 provide an angularly displacing means by which the first pin 102 that is mounted thereon can be displaced with its associated ring plate 98 in any desired, fixed, spaced-apart, gear train, timed relationship with the second pin 94 that is mounted on the clutch plate 88.

Another gear 116 is shown fixedly connected by a press fit or staked connection at 118 to a hollow hub member 120. The inner, cylindrically-shaped, apertured wall portion 122 of the hub member 120 is, in turn, shown slidably mounted for rotation on the stub shaft 48.

FIG. 3 of the drawing shows an arm 124 having a hub portion 126 integral therewith. The hub portion 126 has a cylindrical, apertured wall 128 that is press-fitted or staked at 130 in a fixed position on the rotatable member 120 so that both of these parts 126, 120 can be rotated together as a unit on the stub shaft 48.

The outer end of the stub shaft 48 is provided with a neck portion 132 to receive a pair of gear-retaining cotter plates 134, 136 therein.

Figure 2:
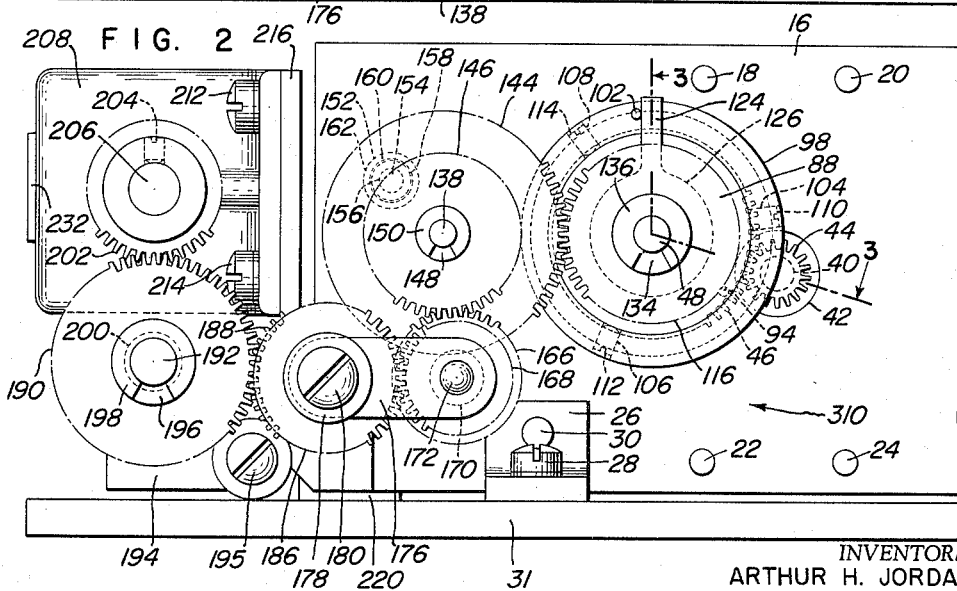
FIG. 2 is a front elevation of the improved, motion-transmitting apparatus.

Another stub shaft 138 is shown in FIGS. 1 and 2 as being fixedly connected by staking it at one end to the stationary bracket 16. The outer, smaller diametral end portion 140 of the stub shaft 138 has a sleeve bearing 142 rotatably mounted thereon. A pair of spaced-apart gears 144, 146 is shown staked to the outer peripheral surface of the sleeve bearing 142. The extreme outer end portion 140 of the stub shaft 138 is also provided with a groove, not shown, into which a pair of gear-retaining cotter plates 148, 150 is inserted.

One end of a hollow cylindrical support member 152 is staked in fixed position, as shown, to the bracket 16. A guide rod 154 projects out of the other hollow end of the support member 152. FIGS. 1 and 2 of the drawing show the inner wall 156 of a hollow friction sleeve 158 in slidable engagement with the outer end of the guide rod 154. A coil spring 160, which is positioned to surround the outer, peripheral surface of the sleeve 158, has one of its ends in compressing contact with the inner surface of a solid disc 162 formed as an integral part of the sleeve 158. The outer surface of the solid disc end of the friction sleeve 158 is shown in frictional surface engagement at 164 with the inner face of the gear 144 to introduce a preselected drag in the gear train presently being described.

Another pair of gears 166, 168 is shown staked in a spaced-apart fixed position on the sleeve bearing 170 that, in turn, is rotatably mounted on a stationary shaft 172 that has its opposite ends peened over to retain the bearing and gears 166, 168 thereon.

The outer end portion of the shaft 172 is supported by an apertured wall portion 174 and formed in the right end of the support bar 176. The left end of the support bar 176 is supported by means of washer 178 and a partially-threaded, screw-gear, supporting shaft 180. The shaft 180, in turn, is threadedly supported at its inner end by a wall forming a bored out central portion in a hollow stub shaft 182. The inner end of the stub shaft 182 is retained in a fixed position by staking it to the bracket 16.

A bearing sleeve 184 is rotatably mounted on an outer unthreaded end of the gear supporting shaft 180, and two spaced-apart gears 186, 188 are shown mounted in fixed staked-in-place positions on its outer peripheral surface for rotation therewith.

The gear 188 is shown in driving engagement with the gear 190 which is rotatably mounted for rotation on the outer end of the stub shaft 192. The inner end of the stub shaft 192 is fixedly secured by staking to a support plate 194. The support plate, in turn, is fixedly connected by suitable connecting means, such as welding or the screw and washer connection 195 to the bracket 16.

A washer 196 and cotter gear retaining plate 198 are used to hold a bearing sleeve 200 forming an inner, cylindrical, apertured wall of the gear 190 in rotatable but nonlateral moving engagement on the shaft 192. The gear 190 is, in turn, shown in driving engagement with the gear 202 that is fixedly connected by a suitable number of cup point set screws, such as the cup point set screw 204, to the drive shaft 206 of a digital integrator counter 208.

The digital counter 208 is fixedly connected by a suitable number of screw-washer connections, for example 210, 212, 214, to a bracket 216. The bracket 216 is fixedly mounted by means of the braces 218, 220 and screw connections 222, 224, 226, 228, shown in FIG. 1, to the base plate 31.

A ring nut 230 is also shown associated with one end of the counter which can be used to manually reset the numbers that are registered on its front face 232 in a reverse or detotalizing direction to any number that lies between the number that has been placed on the counter by the motor-driven gear train, just described, and a zero indication.

In order to have a clear understanding of the usefulness of the time delay mechanism disclosed herein, a brief description will hereinafter be disclosed of the pulse duration type telemetering system in which such a mechanism can be advantageously employed. Such a telemetering system, which is disclosed in FIG. 6 of the drawing is comprised of a telemeter transmitter 234, a telemeter channel 236 and a telemeter receiver 238.

The telemeter transmitter 234 receives a pressure signal which is to be integrated by way of the conduit 240. The other end of this conduit 240 may be, for example, connected to a differential pressure measuring apparatus 242 that, in turn, measures the drop in pressure occurring across an orifice 244 in a flow line 246 by means of the conduits 248, 250 and then transmits a pressure proportional to this drop-through conduit 240. This pressure is applied to the external surface of the bellows 252 within casing 254 to move the mechanical link 256, along with the indicator arm 258, in contact with the scale 260 and vane 262 connected therewith in a manner similar to that disclosed in the McGhee Patent 2,683,564.

FIG. 6 also discloses a pair of inductance coils 264, 266 pivoted on a roller support arm 268 and a pivot 270 about which the vane 262 rotates. The roller support arm 268 carries a roller 272 which is shown in rolling contact with the outer surface of a rotatable integrating cam member 274 the integrating function of which is explained in detail in the aforementioned McGhee patent.

A pair of conductors 276, 278 connects the inductance coils 264, 266 by way of oscillator 280 with an A.C. power source 282 connected therewith. A D.C. source 284 is also shown supplying a current from a rectifier, not shown, to the conductor 286 connected to a coil of relay 288 which retains the switch contact portion 290 in contact with either the switch contact 292 or 294.

The electrical transmitting conductors 296, 298, 300, forming component parts of the aforementioned telemetering channel 236, are shown having their left ends connected to this relay 288.

FIG. 6 shows how the right end of the conductor 300 in receiver 238 is connected to the shading coils 302, 304 and the secondary coil 306 of the electric motor 10 shown in FIG. 1. FIG. 6 also shows how the conductors 296, 298 are connected by way of the secondary coil 306 of the motor 10.

FIG. 6 further shows the A.C. power source 308 electrically connected to the field coil 12 of the motor 10. The output shaft 40 of this reversible motor 10 is, in turn, connected by way of a gear train and clutch mechanism 310 that extends between the mechanism which represents all of the previously-described gear train elements and the one-way clutch parts that connect or disconnect this shaft 40 with the counter shaft 206.

When a measurement of a variable such as a quantity of fluid passing through the conduit 246 over a given period of time is being made, the relay 288 will be energized to move the switch contact 290 into its solid line contact position with the switch contact 292. Under this condition, the motor 10 will be energized so that its drive shaft 40 will rotate in the direction indicated by the arrow shown adjacent the shaft in FIG. 4. This rotary motion will be transmitted by way of pinion 44, gear 46, hub 54, rollers 58, 60, clutch plate 88, ring plate 98 and the pin 102 to the arm 124. By way of an example, the pin 120 will cause the arm 124 to be rotated in a clockwise direction from the solid to the dotted line position shown for this arm 124 in FIG. 4 of the drawing. The rotary motion of the arm 124 will be transmitted to the hub 120 and gear 116 that is integrally connected thereto.

The motion of the gear 116 will, in turn, be transmitted through gear 144, hub 142, gear 146, gears 166, 168, 186, hub 184, gear 188, gear 190 and gear 202, which is fixedly connected to the counter shaft 206 to rotate same and place a digital count in terms of, for example gallons of flow per a selected unit of time, on the counter 208.

FIG. 6 of the drawing reveals a diagram to illustrate the pulse-no pulse characteristic which takes place when the magnitude of the variable being measured by the aforementioned T-second cycle pulse duration telemetering system is at zero, fifty, and one hundred percent full scale value. In each of these three illustrations, it can be seen that a T-second lapse of time of this cycle will initially take place before each digital count of the variable under measurement is transmitted by the motor 10 to the counter 208.

When the switch contact 290 is moved to its non-counting, e.g., dotted line position, the shaft 40 of the motor 10 will be caused to rotate in a clockwise direction or, in other words, in a reverse manner to that shown in FIG. 4. When this happens, the driving pin 102 will be moved in a counter-clockwise direction back to its initial FIG. 4 position at the upper portion of the disc as shown by the solid to dotted line displaced positions of this pin 102 in FIG. 5. This return movement will take place until the other pin 94 is brought into the dotted line contact position with the arm 124. When this occurs, the friction of the gear train that extends between the gears 116 and the gear 202 plus the friction introduced by the previously-mentioned drag sleeve 162 will cause the rollers of the clutch to slip.

In the aforementioned way the counter drive pin 102 will always be repositioned at a precise, angularly-displaced position from the arm 124 so that the counter drive pin 102 will thereafter have to travel through an arc for any one of a number of optional preselected seconds $t$ before it can again engage this arm 124 and rotate same to place an additional fluid flow measurement or any other desired, substitute, varying pulse length of telemetered signal on the counter 208.

Loosening the ring plate 98 and rotating it to a position in which its pin 102 is at a greater angularly-displaced position than that shown in the drawing and then re-tightening the retaining set screws 112, 114 will permit the time duration of the aforementioned preselected number of the initial non-counter driving seconds $t$ that is shown in FIG. 7 to be increased.

Loosening of the ring plate 98 and rotating it in an opposite direction from that just described will reduce the angle that the pins 102 and 94 are displaced from one another, and this, in turn, will permit the time duration of the aforementioned, preselected number of the initial, non-counter, driving seconds $t$ that is shown in FIG. 7 to be decreased.

When the shaft 40 of the motor 10 is initially energized and rotated in a counterclockwise direction, the aforementioned preselected initial non-counter driving period of time $t$ will elapse during the rotary movement of the pin 102 from its position shown at the top of the ring 98 in a clockwise direction shown in FIG. 4 for a counter-driving, electric, pulse-receiving period of time that will depend on the magnitude of the variable under measurement. In the illustration shown, the magnitude of the variable under measurement is, for example, the number of gallons of fluid per minute passing through the flow line 246.

It should be noted that the rollers 58, 60 of the clutch 56 will be brought into clutch-in-engagement with the surface 86 of the clutch plate 88 in the manner which has been previously described when the shaft 40 of the motor 10 is rotated through the last two mentioned, arcuately-displaced, counter-clockwise positions, or in other words, the first and second portions of the pulse portion of the cycle T shown in FIG. 7 of the drawing.

During the remaining no-pulse portion of this cycle, the shaft of the reversible, synchronous motor 10 will be moved in a clockwise direction, in the manner shown in FIG. 5, so that the pin 102 can again be displaced to a position at the top of the ring plate 98, as shown in FIG. 5, so that another time cycle $T^1$, similar to the T-seconds cycle just described, can again be repeated, as shown in FIG. 7. It can thus be seen that the only change which occurs in each of these cycles T, $T^1$ is the time allotted to place a digital count of the magnitude of the variable under measurement on the counter.

From the aforementioned description, it can be seen that a unique, reversible, synchronous motor—one-way, clutch-driven, pin-driving, time delay mechanism has been disclosed whose parts can be adjustably fixed to provide any one of a number of selected fixed periods $t$ of time within a time cycle of a preselected duration T or $T^1$ during which driving connection between the motor and a digital counter associated therewith will be disconnected.

What is claimed is:

1. A time delay apparatus for use in a gear train transmitting power from a drive shaft to a driven shaft, comprising a reversible motor operably connected to rotate the drive shaft in a clockwise and counter-clockwise direction, a stub shaft, a cylindrical hub rotatably mounted on the stub shaft, mechanical driving means between the drive shaft and the hub to rotate the hub in one direction when the drive shaft is rotated in a selected one of two directions and to rotate the hub in an opposite direction on the stub shaft when the drive shaft is rotated in a reverse direction, a clutch plate rotatably mounted on the stub shaft having an inner wall portion forming a race surface thereon, a one-way clutch between the hub and the race surface, a plate of a ring-shaped configuration operably connected for free rotatable movement about an external surface of the clutch plate, connecting means for retaining the ring-shaped plate in a first position on the external surface of the clutch plate, a second cylindrical hub rotatably mounted on the stub shaft, an arm mechanically connected to drive the driven shaft and being fixedly connected to the second hub and extending outwardly therefrom, a first pin protruding outwardly of an end face of the clutch plate and a second pin protruding in the same direction as the first pin outwardly of an end face of the ring plate, each of the pins being mounted at angularly-displaced positions from one another, the second pin being operably positioned to angularly displace the arm in one direction when the motor rotates the drive shaft in said one direction, and the first pin being operably positioned to be rotated thereafter in an opposite direction into surface-to-surface but non-driving contact with the arm when the motor is rotated in the opposite direction to thereby angularly displace the second pin a preselected distance from the arm and to provide an initial time delay in transmitting motion of the second pin to the arm.

2. An adjustable time delay apparatus, comprising a one-way clutch unit, a clutch plate forming an outer race for the clutch unit, a reversible rotating drive means to rotate the clutch unit into engagement with the clutch plate when the drive means is energized for rotation in one direction on the race of the clutch plate and to allow the clutch unit to slip on the race surface of the clutch plate when the means is energized for rotation in the opposite direction, a ring-shaped plate rotatably mounted on an outer surface of the clutch plate for rotation into any one of a number of angularly-displaced fixed time delay positions thereon, a rotatable motion-transmitting element, an arm fixedly connected at one end to a side wall of the element, and a first pin fixedly connected to and protruding from an end wall of the clutch plate and a second pin fixedly connected to and protruding from the ring plate that are positioned in selectively angularly-displaced positions on opposite sides of the arm.

3. The time delay apparatus, defined in claim 2, wherein the end of a spring-biased frictional drag sleeve is engaged with a gear that is in driven engagement with the rotatable motion-transmitting element, said drag sleeve being operable by way of the last-mentioned gear to introduce a sufficient friction drag on the clutch plate after the pin on the clutch plate is rotated by the drive means into contact with the arm.

4. A time delay apparatus for use in a gear train transmitting power from a driving shaft to a driven shaft, said time delay apparatus comprising a stub shaft fixedly positioned to support two rotatable clutch gear parts of said gear train thereon, one of the clutch parts having two adjustably-fixed, spaced-apart pins protruding therefrom, another of said clutch gear parts having an arm positioned in spaced-apart relation between the pins and protruding therefrom on a face that is immediately adjacent the other clutch gear part, a one-way clutch driving means operably connected to positively rotate the first-mentioned clutch gear part into contact and thereafter driving engagement with the arm when the driving means is rotated in one direction, and said driving means being operable in another opposite direction to return the first clutch part to its initial position.

5. The time delay apparatus as defined in claim 4 wherein a means is operably connected to the clutch gear part having the arm thereon to introduce a preselected desired friction drag thereon.

6. The time delay apparatus as defined in claim 4 wherein a means is operably connected to the clutch gear part having the arm thereon to introduce a preselected desired friction drag thereon and wherein the one-way clutch-driving means is comprised of a reversible synchronous motor and a one-way roller clutch operably connected to receive an on pulse electrical signal to drive the motor in one direction and an off pulse electrical signal to drive the motor in the opposite direction.

No references cited.

DAVID J. WILLIAMOWSKY, *Primary Examiner.*